United States Patent [19]

Wessels

[11] Patent Number: 5,206,564
[45] Date of Patent: Apr. 27, 1993

[54] CIRCUIT FOR CONTROLLING LIGHT OUTPUT OF A DISCHARGE LAMP

[75] Inventor: Johannes H. Wessels, Eindhoven, Netherlands

[73] Assignee: U.S. Philips Corporation, New York, N.Y.

[21] Appl. No.: 772,984

[22] Filed: Oct. 7, 1991

[30] Foreign Application Priority Data

Oct. 10, 1990 [NL] Netherlands .......................... 9002202

[51] Int. Cl.$^5$ ............................................ H05B 41/36
[52] U.S. Cl. ..................... 315/209 R; 315/224; 315/DIG. 7; 363/49
[58] Field of Search ................ 315/209 R, 219, 224, 315/DIG. 7; 363/49; 331/111

[56] References Cited

U.S. PATENT DOCUMENTS

| | | | |
|---|---|---|---|
| 4,042,852 | 8/1977 | Zaderj et al. | 315/DIG. 5 X |
| 4,047,089 | 9/1977 | Suzuki et al. | 363/49 |
| 4,461,980 | 7/1984 | Nilssen | 315/DIG. 7 X |
| 4,642,746 | 2/1987 | Lösed | 363/49 |
| 4,712,045 | 12/1987 | Van Meurs | 315/224 |
| 4,887,007 | 12/1989 | Almering et al. | 315/224 X |
| 4,908,551 | 3/1990 | Ludikhuize et al. | 315/209 R |
| 4,920,302 | 4/1990 | Konopka | 315/DIG. 2 X |
| 4,928,039 | 5/1990 | Nilssen | 315/DIG. 2 X |
| 4,949,016 | 8/1990 | De Bijl et al. | 315/224 X |
| 4,965,493 | 10/1990 | Van Meurs et al. | 315/224 |
| 5,068,572 | 11/1991 | Blankers | 315/224 X |

Primary Examiner—Eugene R. LaRoche
Assistant Examiner—Do Hyum Yoo

[57] ABSTRACT

A circuit arrangement for operating a discharge lamp (4). The circuit arrangement is provided with a DC-AC converter (3) and with a starter circuit (5) for starting the DC-AC converter. The starter circuit comprises a circuit (50, 52, 53) for generating starting pulses through the charging of a capacitor (50). The starter circuit also includes a discharge resistor (51) for discharging the capacitor, and a switching element for disconnecting and for keeping the starter circuit disconnected. The starter circuit thus can generate starting pulses in quick succession so that the luminous flux of the lamp is controllable over a wide range.

13 Claims, 1 Drawing Sheet

CIRCUIT FOR CONTROLLING LIGHT OUTPUT OF A DISCHARGE LAMP

BACKGROUND OF THE INVENTION

This invention relates to a circuit arrangement for operating a discharge lamp provided with a DC-AC converter and with a starter circuit for starting the DC-AC converter, in which starter circuit means are present for generating a starting pulse through charging of capacitive means.

A circuit arrangement of the kind mentioned in the opening paragraph is known from U.S. Pat. No. 4,042,852. The known circuit arrangement is suitable for connection to an AC-voltage source of 50 to 60 Hz, the supply voltage being delivered to the DC-AC converter after full-wave rectification and through a buffer capacitor. As a result, the starter circuit for starting the DC-AC converter, and thus for charging the capacitive means, only serves to generate a starting pulse for starting the DC-AC converter after connection to the supply voltage.

In modern circuit arrangements, which also comprise means for controlling the luminous flux generated by the lamp, the DC-AC converter is supplied by means of a comparatively high DC voltage which is realised by means of a switch-mode power supply. Control of the luminous flux is realised then in that the operation of the DC-AC converter is periodically interrupted for short time periods. Under such circumstances it is necessary for the starter circuit to generate starting pulses in quick succession. It is usual for the periodic interruption to take place with a repetition frequency having a value situated in the range from approximately 100 Hz to approximately 100 kHz. The duration of the interruption may then lie between 100 Hz to approximately 100 kHz. The duration of the interruption may then lie between 0 and 1 times the period of the repetition frequency.

SUMMARY OF THE INVENTION

The invention has for an object to provide an apparatus in which a switching arrangement of the kind described in the opening paragraph is also suitable for controlling the luminous flux of the lamp.

A switching arrangement of the kind mentioned in the opening paragraph is for this purpose characterized in that the starter circuit comprises discharging means for discharging the capacitive means and disconnecting means for keeping the starter circuit disconnected.

The use of discharging means for discharging the capacitive means makes it possible for the starter circuit to generate starting pulses having a high frequency. However, to prevent the starter circuit from generating starting pulses at moments at which the DC-AC converter is already operating, the generation of starting pulses is advantageously suppressed through the use of disconnecting means for keeping the starter circuit disconnected. Preferably, the disconnecting means are so dimensioned that the starter circuit is disconnected after the generation of a first starting pulse and is kept disconnected until the operation of the DC-AC converter is interrupted.

In an advantageous embodiment of a circuit arrangement according to the invention, in which the means for generating starting pulses comprises a switch in a charging circuit of the capacitive means, the disconnecting means preferably comprises a switching element for controlling the switch in the charging circuit. A reproducible and reliable disconnection of the starter circuit can be realised by simple means in this manner.

The necessity of having a fast discharge possibility for the capacitive means of the starter circuit is advantageously met in a preferred embodiment of the invention by means of an impedance of ohmic character which shunts the capacitive means. This renders a fast discharge possible the moment that the charging circuit is interrupted.

A circuit arrangement according to the invention, which also is capable of controlling the luminous flux, is highly suitable for operating fluorescent and compact fluorescent lamps. In particular, such a circuit is suitable for operating electrodeless fluorescent lamps.

BRIEF DESCRIPTION OF THE DRAWING

An embodiment of a circuit arrangement according to the invention will be explained in more detail with reference to the accompanying drawing.

In the drawing.

DESCRIPTION OF THE PREFERRED EMBODIMENTS

Figure 1:
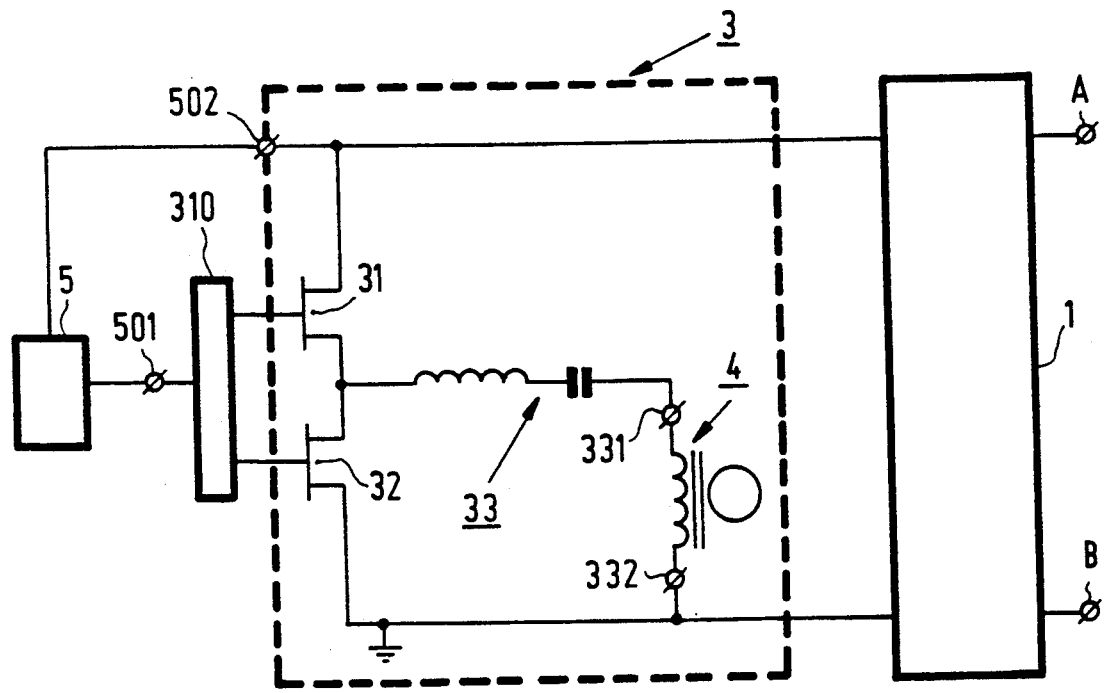
FIG. 1 shows a circuit arrangement according to the invention.

In FIG. 1, A and B are connection terminals for connecting the circuit arrangement to a supply source. Reference numeral 1 denotes a switch-mode power supply which generates a high-frequency pulsatory direct current and which serves as a supply for a DC-AC converter 3. The DC-AC converter comprises two switches 31, 32 which are made to conduct alternately by a control circuit 310. The DC-AC converter also comprises a load branch 33 provided with lamp connection terminals 331, 332, between which an electrodeless fluorescent lamp 4 is connected.

The circuit arrangement is further provided with a starter circuit 5 for starting the DC-AC converter.

Figure 2:
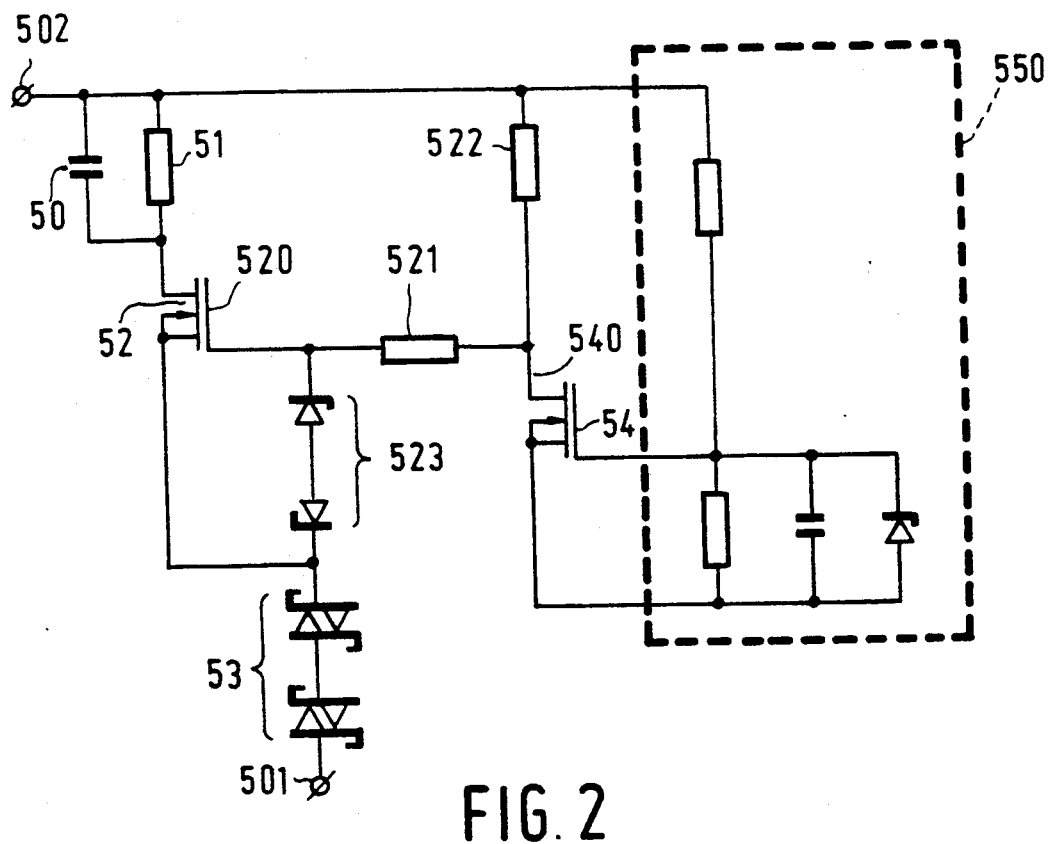
FIG. 2 shows a starter circuit forming a part of the circuit arrangement according to FIG. 1.

In FIG. 2, the starter circuit 5 is shown in greater detail. In the starter circuit 5, capacitive means are present in the form of a capacitor 50 by means of which starting pulses are generated through the charging of capacitor 50. Means for generating starting pulses comprise a semiconductor switch 52 in a charging circuit of the capacitor 50. The charging circuit further comprises breakdown elements 53 and is connected to control circuit 310 through connection point 501.

The starter circuit also comprises disconnecting means which in the embodiment described are formed by a switching element 54 whose electrode 540 is connected to a control electrode 520 of semiconductor switch 52.

The capacitor 50 is shunted by discharging means formed by resistor 51, which is an impedance having an ohmic character. The capacitor 50, resistor 51, and switching element 54 are connected to the switch-mode power supply by way of connection point 502. Switching element 54 is provided with an impedance network 550 for setting the voltage level at which switching element 54 switches (switching level). A resistor 521 is also provided between electrode 520 and electrode 540, and a resistor 522 is provided between electrode 540 and connection point 502 for setting the switching levels of the switches 52 and 54. The switching element 54 and the impedance network 550 together provide a means for inhibiting the operation of the semiconductor switch 52 when the DC/AC converter is in operation.

Zener diodes 523 are provided between electrode 520 and breakdown elements 53 as a protection against overvoltages.

The operation of the starter circuit is as follows. Immediately after the application of the DC voltage to connection point 502, semiconductor switch 52 becomes conducting by way of resistors 522 and 521. The moment the pulsatory DC voltage has reached the voltage level of breakdown elements 53, pulsatory charging of capacitor 50 takes place by way of semiconductor switch 52, breakdown elements 53, connection point 501, control circuit 310, and DC-AC converter 3. This provides a voltage pulse in control circuit 310 by which the DC-AC converter is started. When a value of the pulsatory DC voltage is reached which is higher than the breakdown voltage of the breakdown elements 53, the switching level of switching element 54 being reached by way of the impedance network 550, switching element 54 becomes conductive and semiconductor switch 52 is rendered non-conductive. Capacitor 50 will then be discharged through resistor 51.

In a practical embodiment of the circuit arrangement described, semiconductor switch 52 and switching element 54 are constructed as power MOSFETs, type BST 78. Capacitor 50 has a value of 3.9 nF and resistor 51 of 220 KΩ. Breakdown elements 53 are Diacs of the BR 100 type.

The impedance network 550 is built up from a resistor of 6.8 MΩ in series with a parallel circuit of a 120 KΩ resistor, a 560 pF capacitor, and a protection zener diode having a zener voltage of 12 V. The resistors 521 and 522 have values of 1 MΩ and 2.7 MΩ, respectively.

In a practical embodiment, the switch-mode power supply 1 upon connection to a 220 V, 50 Hz supply source provides a pulsatory DC voltage of 380 V and has a repetition frequency of 200 Hz. The pulse width can be varied between 0 ms and 5 ms, that is, between 0 and 1 times the period of the repetition frequency. The switches 31, 32 of the DC-AC converter are made alternately conducting with a frequency of 2.65 MHz. The luminous flux of an electrodeless fluorescent lamp operated by means of the circuit arrangement described can be controlled between 10% and 100% of the rated value.

I claim:

1. A circuit arrangement for operating a discharge lamp, said circuit arrangement comprising: a DC/AC converter for connection to a DC supply and a starting circuit for starting said DC/AC converter, said starting circuit including capacitive means for connection to said DC supply, said starting circuit generating a starting pulse when said capacitive means is connected to said DC supply, said starting circuit also comprising disconnecting means and means for discharging the capacitive means, said disconnecting means having a control input operable from said DC supply to enable said discharging means to operate to discharge said capacitive means.

2. A circuit arrangement in accordance with claim 1, wherein a switch is connected in series with said capacitive means and with a voltage breakdown element to provide a charge circuit for the capacitive means, said starting pulse being produced when a breakdown voltage of said breakdown element is reached, and wherein said disconnecting means enables said discharging means to operate to discharge said capacitive means by interrupting current flow through said switch.

3. A circuit arrangement in accordance with claim 2, wherein said disconnecting means includes a switching element which is connected to said switch for interrupting said current flow.

4. A circuit arrangement in accordance with claim 3, wherein said switching element is connected to a threshold circuit which operates from said DC supply to control the switching element when said switching element is operated to interrupt said current flow.

5. A circuit arrangement in accordance with claim 4, wherein said discharging means is a resistor connected in parallel with said capacitive means.

6. A circuit for operating a discharge lamp, said circuit comprising:
   first and second DC supply voltage terminals,
   a DC/AC converter coupled to said first and second DC supply voltage terminals and having an output for energizing the discharge lamp,
   a control circuit having output means coupled to control input means of the DC/AC converter to control the operation thereof, and
   a starter circuit coupled to the first DC supply voltage terminal and to a control input of the control circuit, wherein the starter circuit comprises a capacitor and a first controlled switching device coupled to the capacitor for charging and discharging the capacitor thereby to generate one or more starting pulses for starting the DC/AC converter, means for supplying said one or more starting pulses to the control input of the control circuit, and a second controlled switching device coupled to at least one of the supply voltage terminals and to the first controlled switching device so as to inhibit operation of the first controlled switching device when the DC/AC converter is in operation, thereby to inhibit generation of said starting pulses.

7. A circuit as claimed in claim 6 wherein said first controlled switching device is connected in a charge circuit of the capacitor and said one or more starting pulses are generated via the charging of the capacitor.

8. A circuit as claimed in claim 6 which further comprises an impedance of ohmic character which shunts the capacitor so as to provide a discharge path for the capacitor exclusive of the first controlled switching device.

9. A circuit as claimed in claim 7 which further comprises an impedance of ohmic character which shunts the capacitor.

10. A circuit for operating a discharge lamp, said circuit comprising:
    first and second Dc supply voltage terminals,
    a DC/AC converter coupled to said first and second DC supply voltage terminals and having an output for energizing the discharge lamp,
    a control circuit having output means coupled to control input means of the DC/AC converter and operative to periodically interrupt operation of the DC/AC converter so as to vary duty cycle thereof in a manner to control the light output of the lamp over a given range of light values, and
    a starter circuit operable from the DC supply voltage terminals for generating and supplying at least one starting pulse to a control input of the control circuit during time periods when operation of the DC/AC converter is periodically interrupted, said starter circuit comprising a capacitor coupled to at least one of the supply voltage terminals and a first controlled switching device coupled to the capacitor to control the charge and discharge of the capacitor thereby to generate said at least one starting pulse, and means for inhibiting operation of the first controlled switching device when the DC/AC converter is in operation, thereby to inhibit generation of said at least one starting pulse during those time periods when the DC/AC converter is in operation.

11. A circuit as claimed in claim 10 wherein a charge circuit includes a series circuit of the capacitor, the first controlled switching device and a voltage breakdown element coupled to at least one of said DC supply voltage terminals, said starting pulse being generated when a breakdown voltage of the voltage breakdown element is reached, and said inhibiting means comprises, a second controlled switching device coupled to the first controlled switching device to interrupt current flow therein thereby to enable the capacitor to discharge via a discharge circuit coupled thereto.

12. A circuit as claimed in claim 10 wherein said inhibiting means comprises, a second controlled switching device coupled to the first controlled switching device and controlled by a threshold circuit operable from the DC supply voltage terminals to interrupt current flow in the first controlled switching device thereby to enable the capacitor to discharge via a discharge circuit coupled thereto.

13. A circuit as claimed in claim 10 wherein the discharge lamp comprises an electrodeless fluorescent lamp.

* * * * *

UNITED STATES PATENT AND TRADEMARK OFFICE
CERTIFICATE OF CORRECTION

PATENT NO. : 5,206,564
DATED : Apr. 27, 1993
INVENTOR(S) : Wessels

It is certified that error appears in the above-indentified patent and that said Letters Patent is hereby corrected as shown below:

Column 4   line 53, change "Dc" to --DC--;
           line 60, after "vary" insert --the--.

Signed and Sealed this

Twenty-third Day of July, 1996

*Attest:*

BRUCE LEHMAN

*Attesting Officer*      *Commissioner of Patents and Trademarks*